(12) United States Patent
Ryu et al.

(10) Patent No.: US 9,174,639 B2
(45) Date of Patent: Nov. 3, 2015

(54) SHIFT CONTROL METHOD AND SYSTEM OF HYBRID VEHICLE

(71) Applicant: Hyundai Motor Company, Seoul (KR)

(72) Inventors: Sang Mo Ryu, Busan (KR); Myunggyu Kim, Seoul (KR); Yeonho Kim, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 35 days.

(21) Appl. No.: 14/106,570

(22) Filed: Dec. 13, 2013

(65) Prior Publication Data
US 2015/0051765 A1 Feb. 19, 2015

(30) Foreign Application Priority Data
Aug. 13, 2013 (KR) .......................... 10-2013-0095813

(51) Int. Cl.
*B60W 20/00* (2006.01)

(52) U.S. Cl.
CPC ............... *B60W 20/30* (2013.01); *B60W 20/10* (2013.01); *Y10S 903/902* (2013.01)

(58) Field of Classification Search
USPC .................................................... 701/22, 51
IPC ......... B60W 10/02,10/023, 2510/083, 2510/10, B60W 2510/1025, 2510/0275; Y10T 477/23, Y10T 477/26, 477/30, 477/32, 477/638, 477/6418, Y10T 477/71
See application file for complete search history.

(56) References Cited

U.S. PATENT DOCUMENTS

2004/0058779 A1* 3/2004 Ayabe ........................... 477/121
2013/0325238 A1* 12/2013 Kato et al. ...................... 701/22
2014/0277974 A1* 9/2014 Teslak et al. ................... 701/54

FOREIGN PATENT DOCUMENTS

| JP | 2012-86676 A | 5/2012 |
|---|---|---|
| JP | 2012-153154 A | 8/2012 |
| KR | 1996-0021748 A | 7/1996 |
| KR | 10-0916388 B1 | 9/2009 |
| KR | 10-2012-0000951 A | 1/2012 |
| KR | 10-1284306 B1 | 7/2013 |

* cited by examiner

*Primary Examiner* — Yonel Beaulieu
(74) *Attorney, Agent, or Firm* — Morgan, Lewis & Bockius LLP

(57) ABSTRACT

A shift control method and system of a hybrid vehicle that prevent engine clutch slip occurring when a transfer torque of engine clutch is greater than an allowable transfer torque under unfavorable driving conditions by controlling a shifting time, may include, (a) detecting an engine torque. (b) determining an input torque of an engine clutch based on the engine torque. (c) comparing the determined input torque and a predetermined allowable transfer torque of the engine clutch. (d) increasing a present shifting time by a predetermined value when the determined input torque is greater than the allowable transfer torque and applying the increased shifting time.

5 Claims, 4 Drawing Sheets

SHIFT CONTROL METHOD AND SYSTEM OF HYBRID VEHICLE

CROSS-REFERENCE TO RELATED APPLICATION

The present application claims priority to Korean Patent Application No. 10-2013-0095813 filed on Aug. 13, 2013, the entire contents of which is incorporated herein for all purposes by this reference.

BACKGROUND OF THE INVENTION

1. Field of the Invention

The present invention relates to a shift control method and system of a hybrid vehicle. More particularly, the present invention relates to a shift control method and system of a hybrid vehicle that prevent engine clutch slip from occurring when a transfer torque of engine clutch is greater than an allowable transfer torque under unfavorable driving conditions by controlling a shifting time.

2. Description of Related Art

As is generally known in the art, a hybrid vehicle uses an internal combustion engine and a battery power supply together. That is, the hybrid vehicle efficiently combines power of the internal combustion engine and power of a driving motor for use.

As illustrated in FIG. 1, the hybrid vehicle may include, for example, an engine 10, a driving motor 20, an engine clutch 30 for intermitting between power between the engine 10 and the driving motor 20, a transmission 40, a differential gear device 50, a battery 60, an integrated starter-generator 70 for starting the engine 10 or generating electricity by rotational force of the engine 10, and vehicle wheels 80.

Furthermore, the hybrid vehicle may include a hybrid control unit (HCU) 200 for controlling an entire operation of the hybrid vehicle. an engine control unit (ECU) 110 for controlling an operation of the engine 10. a motor control unit (MCU) 120 for controlling an operation of the driving motor 20. a transmission control unit (TCU) 140 for controlling an operation of the transmission 40. a battery control unit (BCU) 160 for controlling and managing the battery 60.

The battery control unit 160 may be called a battery management system (BMS). The integrated starter-generator 70 may be called an integrated starter & generator (ISG), or a hybrid starter & generator (HSG).

The hybrid vehicle may be driven in a driving mode such as an electric vehicle (EV) mode which is a true electric vehicle mode using only power of the driving motor 20, a hybrid vehicle (HEV) mode which uses rotational force of the engine 10 as main power and uses rotational force of the driving motor 20 as auxiliary power, and a regenerative braking (RB) mode for collecting braking and inertial energy during driving by braking or inertia of the vehicle through electric generation of the driving motor 20 to charge the battery 60.

The hybrid vehicle may use a dry-type engine clutch, and the dry-type engine clutch should be maintained fully closed condition while shifting. Therefore, an allowable transfer torque of the dry-type engine clutch may be determined by a motor, a rotational inertia of the engine, an angular acceleration, and an engine torque.

However, engine clutch slip may occur because a transfer torque is greater than an allowable transfer torque when the hybrid vehicle is operated under unfavorable driving conditions. For example, the engine clutch slip may occur when the hybrid vehicle is operated at an extremely low temperature or the hybrid vehicle shifts according to an additional torque of the engine.

That is, when the hybrid vehicle is operated under unfavorable conditions, the engine clutch slip may occur due to a difference of rotational inertia between the motor and the engine that is generated when the transfer torque is greater than the allowable transfer torque during shifting. when such an engine clutch slip occurs, the hybrid vehicle is negatively influenced with regard to shifting safety, vehicle vibration, and fuel consumption.

In order to prevent the aforementioned problem, the allowable transfer torque of the engine clutch is increased, but the size of the engine clutch and a secure space for installing it need to increase.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a shift control method and system of a hybrid vehicle having advantages of preventing engine clutch slip generated when transfer torque of an engine clutch is greater than an allowable transfer torque according to unfavorable driving conditions by controlling a shifting time.

In an aspect of the present invention, a shift control method of a hybrid vehicle may include (a) detecting an engine torque, (b) determining an input torque of an engine clutch based on the engine torque, (c) comparing the determined input torque and a predetermined allowable transfer torque of the engine clutch, and (d) increasing a present shifting time by a predetermined value when the determined input torque is greater than the allowable transfer torque, and applying the increased shifting time.

The method may further include (e) comparing the predetermined allowable transfer torque and the input torque which is recalculated after applying the shifting time increased by the predetermined value, wherein the steps (d) and (e) are repeatedly performed when the input torque which is recalculated after applying the shifting time increased by the predetermined value is greater than the predetermined allowable transfer torque.

The input torque is determined by the equation $T_{in}=T_E*(I_{input}*a)$, and $T_{in}$ is the input torque, $T_E$ is the engine torque, $I_{input}$ is input inertia or rotational inertia of an engine, and a is angular acceleration.

The input torque is determined by multiplying the predetermined allowable transfer torque by a predetermined safety coefficient.

The shifting time is increased by a predetermined ratio.

In another aspect of the present invention, a shift control system of a hybrid vehicle may include a dry-type engine clutch configured to control transmission of power between an engine and a motor, an engine control unit (ECU) configured to control the engine, a motor control unit (MCU) configured to control the motor, a transmission control unit (TCU) configured to control a transmission, a hybrid control unit (HCU) configured to control an entire operation of the hybrid vehicle, and a shifting controller configured to increase a shifting time by a predetermined value when an input torque of the engine clutch determined on the basis of engine torque, input inertia, and angular acceleration is greater than a predetermined allowable transfer torque of the engine clutch, wherein the shifting controller is operated by a predetermined program for performing the forgoing method.

As described above, according to an exemplary embodiment of the present invention, the present invention prevents engine clutch slip occurring when a transfer torque of the engine clutch is greater than an allowable transfer torque under unfavorable driving conditions by controlling a shifting time, so that shifting safety and fuel consumption of the hybrid vehicle are improved.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
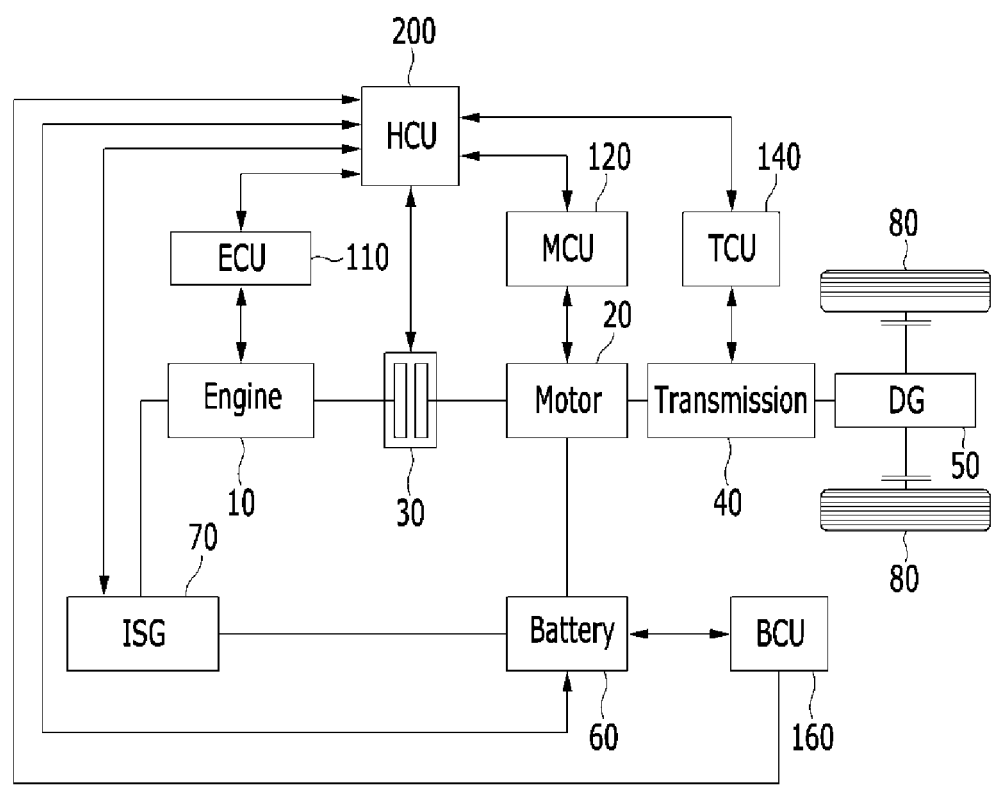
FIG. 1 is a schematic block diagram of a general hybrid vehicle.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Through the present specification, unless explicitly described otherwise, "including" any components will be understood to imply the inclusion of other components rather that the exclusion of any other components.

Like reference numerals are given to like components throughout the specification.

Figure 2:
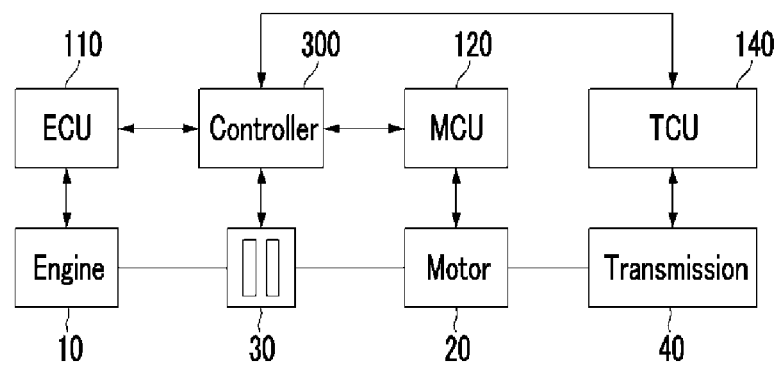
FIG. 2 is a schematic block diagram of a shift control system of a hybrid vehicle according to an exemplary embodiment of the present invention.

FIG. 2 is a schematic block diagram of a shift control system of a hybrid vehicle according to an exemplary embodiment of the present invention.

The shift control system of the hybrid vehicle according to an exemplary embodiment of the present invention controls a shifting time when an input torque of an engine clutch of the hybrid vehicle is greater than a predetermined allowable transfer torque.

The shift control system of the hybrid vehicle according to an exemplary embodiment of the present invention may include an engine clutch 30 for controlling a transmission of power between an engine 10 and a motor 20, an engine control unit (ECU) 110 for controlling the engine 10, a motor control unit (MCU) 120 for controlling the motor 20, a transmission control unit (TCU) 140 for controlling a transmission 40, and a controller 300 for increasing a shifting time by a predetermined value when an input torque of the engine clutch 30 calculated on the basis of an engine torque, an input inertia, and an angular acceleration is greater than a predetermined allowable transfer torque of the engine clutch 30.

The engine 10, the motor 20, the transmission 40, the engine control unit 110, motor control unit 120, and transmission control unit 140 may be installed in a general hybrid vehicle as shown in FIG. 1.

The engine clutch 30 according to an exemplary embodiment of the present invention may preferably be a dry-type engine clutch.

The controller 300 may be implemented with one or more microprocessors operated by a predetermined program or hardware including the microprocessor, and the predetermined program includes a series of commands for performing a shifting control method of a hybrid vehicle according to an exemplary embodiment of the present invention to be described below.

The controller 300 according to an exemplary embodiment of the present invention may preferably play a role of a hybrid control unit (HCU) 200 as shown in FIG. 1. That is, the controller 300 may include the hybrid control unit 200 or be included in the hybrid control unit 200.

Hereinafter, the shifting control method of the vehicle according to an exemplary embodiment of the present invention will be described in detail with reference to the accompanying drawings.

Figure 3:
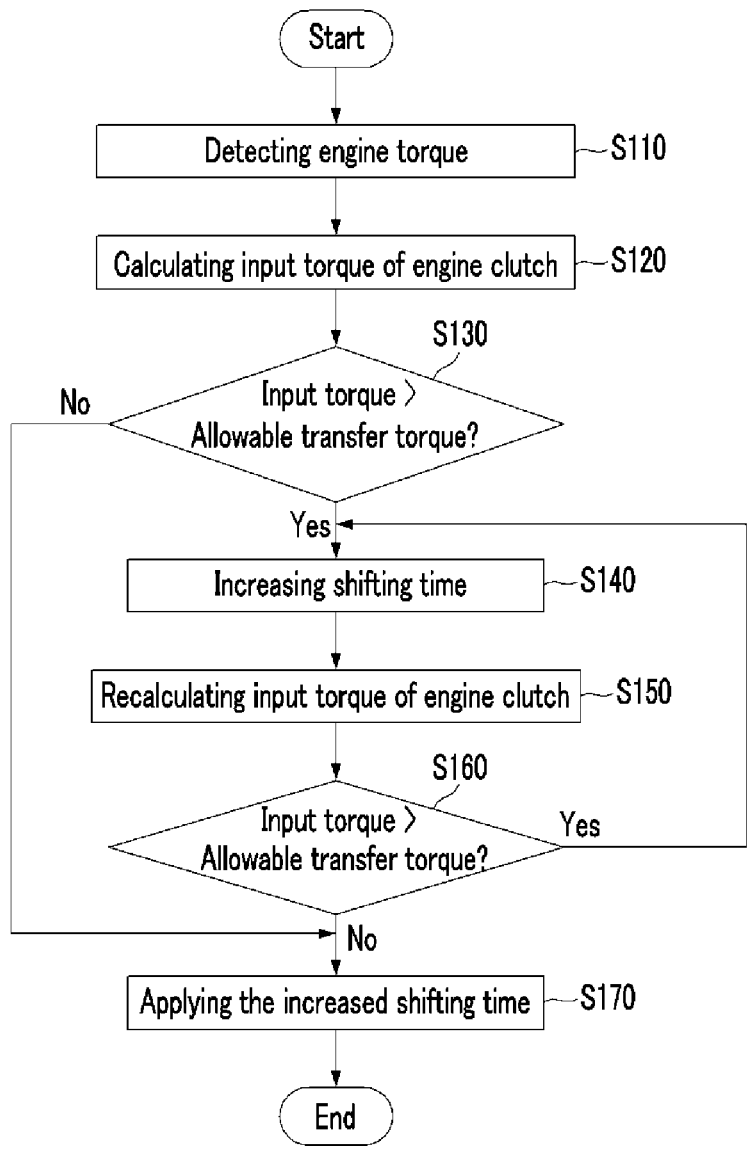
FIG. 3 is a flowchart showing a shift control method of a hybrid vehicle according to an exemplary embodiment of the present invention.

FIG. 3 is a flowchart showing a shift control method of a hybrid vehicle according to an exemplary embodiment of the present invention.

As shown in FIG. 3, the controller 300 detects an engine torque while the hybrid vehicle operates at step S110. For example, the controller 300 may use the engine torque detected by the engine control unit ECU 110. The fact that the engine control unit ECU 110 detects the engine torque is publicly known, so a detailed description thereof will be omitted in the present specification.

If the engine torque is detected, the controller 300 calculates the input torque of the engine clutch 30 at step S120. The controller 300 may use the engine torque while calculating the input torque. For example, the controller 300 may calculate the input torque by the equation below.

$$T_{in} = T_E * (I_{input} * a)$$

($T_{in}$, input torque, $T_E$, engine torque, $I_{input}$, input inertia or rotational inertia of engine, a, angular acceleration)

The controller 300 may calculate the input torque according to the equation above, but it should be understood that the present invention is not limited thereto. The controller 300 may calculate the input torque by any method which is well known in the art. Also, the controller 300 may calculate the input torque by multiplying an allowable transfer torque of the engine clutch 30 which will be described later by a predetermined safety coefficient (for example, 0.8).

The input inertia and the angular acceleration of the engine clutch 30 in the equation above are calculated or detected in the art, so a detailed description thereof will be omitted in the present specification.

The input inertia of the engine clutch 30 may be the rotational inertia of the engine.

If the input torque is calculated, the controller 300 compares the input torque and a predetermined allowable transfer torque at step S130.

The allowable transfer torque may be a predetermined value found by using an available value of the engine clutch 30.

After comparing the input torque and the allowable transfer torque in step S130, if when the input torque is greater than the allowable transfer torque, the controller 300 increases a present shifting time (for example, by 0.3 seconds) at step S140.

Figure 4:
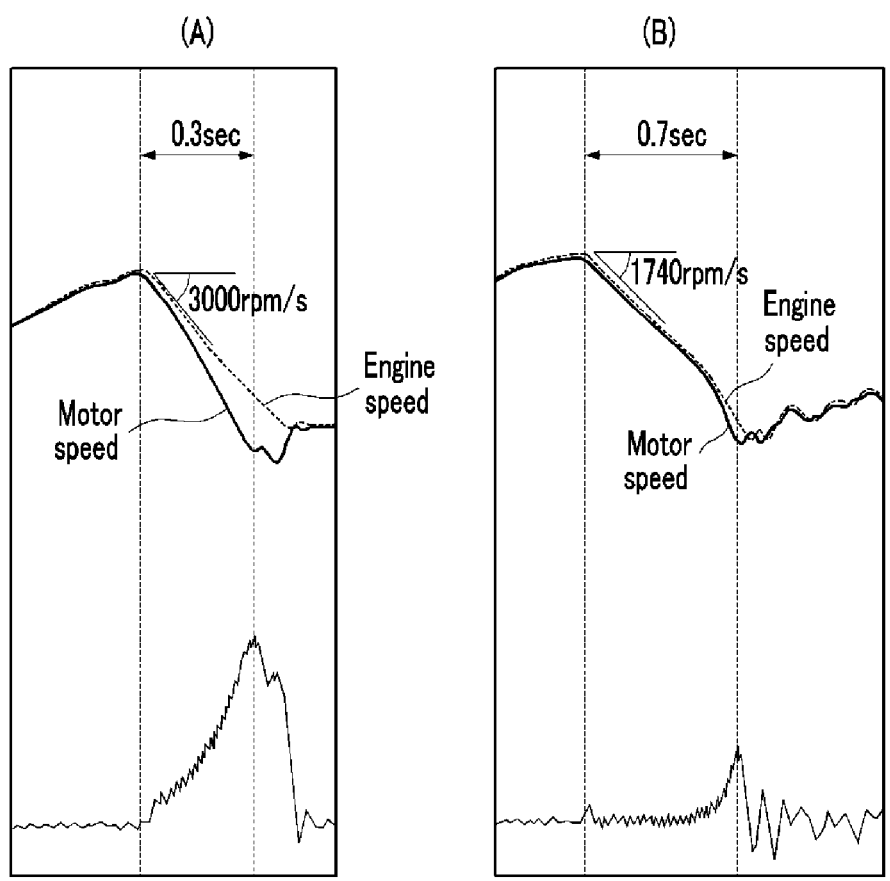
FIG. 4 is a graph for describing an operation of a shift control method and system of a hybrid vehicle according to an exemplary embodiment of the present invention.

For example, if the input torque is greater than the allowable transfer torque, the controller 300 may increase the present shifting time of 0.3 seconds to 0.7 seconds as shown in FIG. 4.

In the past, the shifting time was set as the short 0.3 seconds as shown in FIG. 4 (A) when the input torque was greater than the allowable transfer torque, so a slip of the engine clutch 30 occurred because the engine speed and/or motor speed variation was 3000 rpm/s. That is, the shifting time was maintained short when the input torque was greater than the allowable transfer torque in the past. Therefore, the engine speed did not follow deceleration of the motor speed due to shifting caused by the difference of rotational inertia of the engine 10 and the motor 20, so the slip of the engine clutch 30 occurred.

On the contrary, according to an exemplary embodiment of the present invention, the controller 300 may increase the shifting time by a predetermined value, for example to 0.7 seconds as shown in FIG. 4 (B) when the input torque is greater than the allowable transfer torque, so that the controller 300 may prevent the slip of the engine clutch 30 that occurred in the past.

That is, if when the shifting time is lengthened to 0.7 seconds when the input torque is greater than the allowable transfer torque, the engine speed and/or motor speed variation is 1740 rpm/s and the recalculated input torque is decreased accordingly (S150), so that the slip of the engine clutch 30 does not occur because the engine speed is almost equal to the motor speed.

In case the input torque is greater than the allowable transfer torque as described above occurs when the hybrid vehicle is operated under unfavorable driving conditions, for example at less than −40 degrees C., the controller 300 may perform the method according to an exemplary embodiment of the present invention only under predetermined driving conditions, but it should be understood that the present invention is not limited thereto.

If the input torque recalculated in step S150 based on the increased shifting time in step S140 is still greater than the allowable transfer torque (S160), the controller 300 repeatedly performs steps after S140 to try to decrease the input torque by increasing the shifting time.

The shifting time is increased by a predetermined ratio in step S140, for example, from 100 to 250 percent of the present shifting time.

If the input torque is less than or equal to the allowable transfer torque in steps S130 and/or S160, the controller 300 applies each corresponding shifting time to the shifting in step S170.

Thereby, according to an exemplary embodiment of the present invention, the problem of having engine clutch slip occur can be solved without increasing the size of the engine clutch by controlling the shifting time.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings as well as various alternatives and modifications thereof. It is intended that the scope of the invention be defined by the Claims appended hereto and their equivalents.

What is claimed is:

1. A shift control method of a hybrid vehicle comprising:
    (a) detecting an engine torque;
    (b) determining an input torque of an engine clutch based on the engine torque;
    (c) comparing the determined input torque and a predetermined allowable transfer torque of the engine clutch;
    (d) increasing a present shifting time by a predetermined value when the determined input torque is greater than the allowable transfer torque, and applying the increased shifting time to shifting of the hybrid vehicle; and
    e) comparing the predetermined allowable transfer torque and the input torque which is recalculated after applying the shifting time increased by the predetermined value,
    wherein the steps (d) and (e) are repeatedly performed when the input torque which is recalculated after applying the shifting time increased by the predetermined value is greater than the predetermined allowable transfer torque.

2. The method of claim 1,
    wherein the input torque is determined by the equation $T_{in}=T_E*(I_{input}*a)$, and
    wherein $T_{in}$ is the input torque, $T_E$ is the engine torque, $I_{input}$ is input inertia or rotational inertia of an engine, and a is an angular acceleration.

3. The method of claim 1, wherein the input torque is determined by multiplying the predetermined allowable transfer torque by a predetermined safety coefficient.

4. The method of claim 1, wherein the shifting time is increased by a predetermined ratio.

5. A shift control system of a hybrid vehicle comprising:
    a dry-type engine clutch configured to control transmission of power between an engine and a motor;
    an engine control unit (ECU) configured to control the engine;
    a motor control unit (MCU) configured to control the motor;
    a transmission control unit (TCU) configured to control a transmission;
    a hybrid control unit (HCU) configured to control an entire operation of the hybrid vehicle; and a shifting controller configured to determine an input torque of the engine clutch and an engine torque, configured to compare the determined input torque and a predetermined allowable transfer torque, configured to increase a present shifting time by a predetermined value when the input torque of the engine clutch determined on the basis of the engine torque, an input inertia, and an angular acceleration is greater than the predetermined allowable transfer torque of the engine clutch, and configured to apply the increased shifting time to shifting of the hybrid vehicle.

* * * * *